United States Patent [19]
Dudek

[11] 3,920,088
[45] Nov. 18, 1975

[54] POWER TOOL WITH CONTINUOUS AND PULSATING TORQUE OUTPUT CYCLE

[75] Inventor: Edmund C. Dudek, St. Charles, Ill.

[73] Assignee: Thor Power Tool Company, Aurora, Ill.

[22] Filed: Nov. 23, 1973

[21] Appl. No.: 418,779

[52] U.S. Cl. .................................. 173/169; 173/12
[51] Int. Cl.$^2$ ..................... B23B 45/04; B23Q 5/08
[58] Field of Search ................... 173/169, 170, 12; 181/36 A

[56] References Cited
UNITED STATES PATENTS

| | | | |
|---|---|---|---|
| 2,950,775 | 8/1960 | Zwayer | 173/169 X |
| 3,162,250 | 12/1964 | Sindelar | 173/169 X |
| 3,195,702 | 7/1965 | Alexander | 173/169 X |
| 3,299,781 | 1/1967 | Law | 173/169 X |
| 3,635,605 | 1/1972 | Hall et al. | 173/169 X |
| 3,696,834 | 10/1972 | Vonhoff | 173/169 X |

*Primary Examiner*—David H. Brown

[57] ABSTRACT

A pneumatic power tool for applying torque to threaded fasteners so that a precise peak dynamic torque is consistently obtained in joints having different degrees of hardness and other variables. A solenoid-actuated control valve assembly controls the flow of air to the pneumatic motor of the tool, and the control valve assembly is connected to and controlled by an associated electrical control system. The operating cycle of the tool is completely automatic and the control system, acting through the control valve assembly, initially causes the torque output of the tool to be continuous until a predetermined torque level is obtained in the joint being tightened and then to become pulsating for the remainder of the cycle. The pulsating portion of the torque cycle permits a precise peak dynamic torque to be applied to the joint and prevents the reaction torque on the operator from exceeding a predetermined value. Lightweight, poppet-type control and pilot valves are employed in the control valve assembly to reduce response time, and a lightweight construction is employed in the pneumatic motor to reduce the inertia thereof and permit rapid starting and stopping.

8 Claims, 9 Drawing Figures

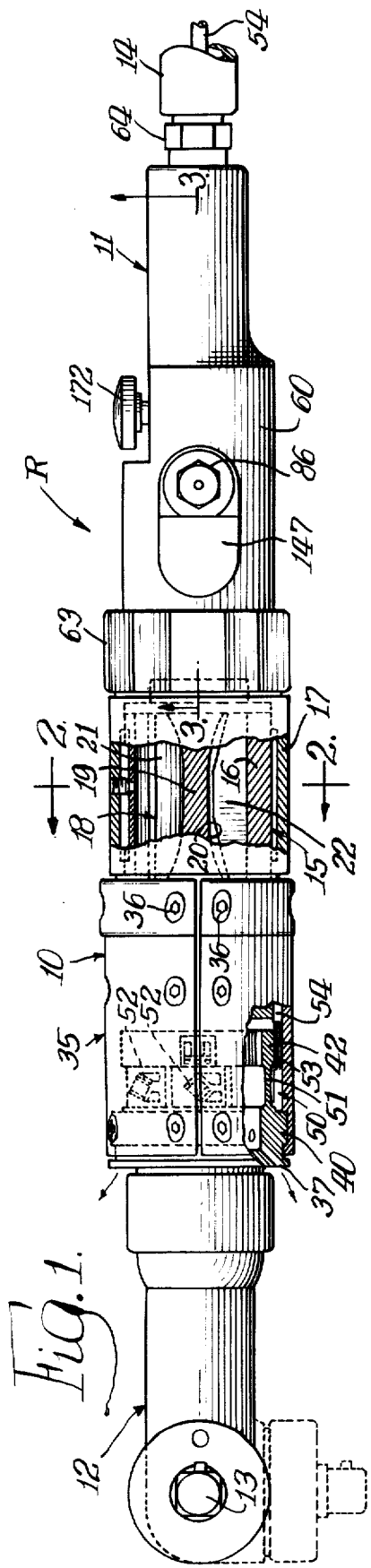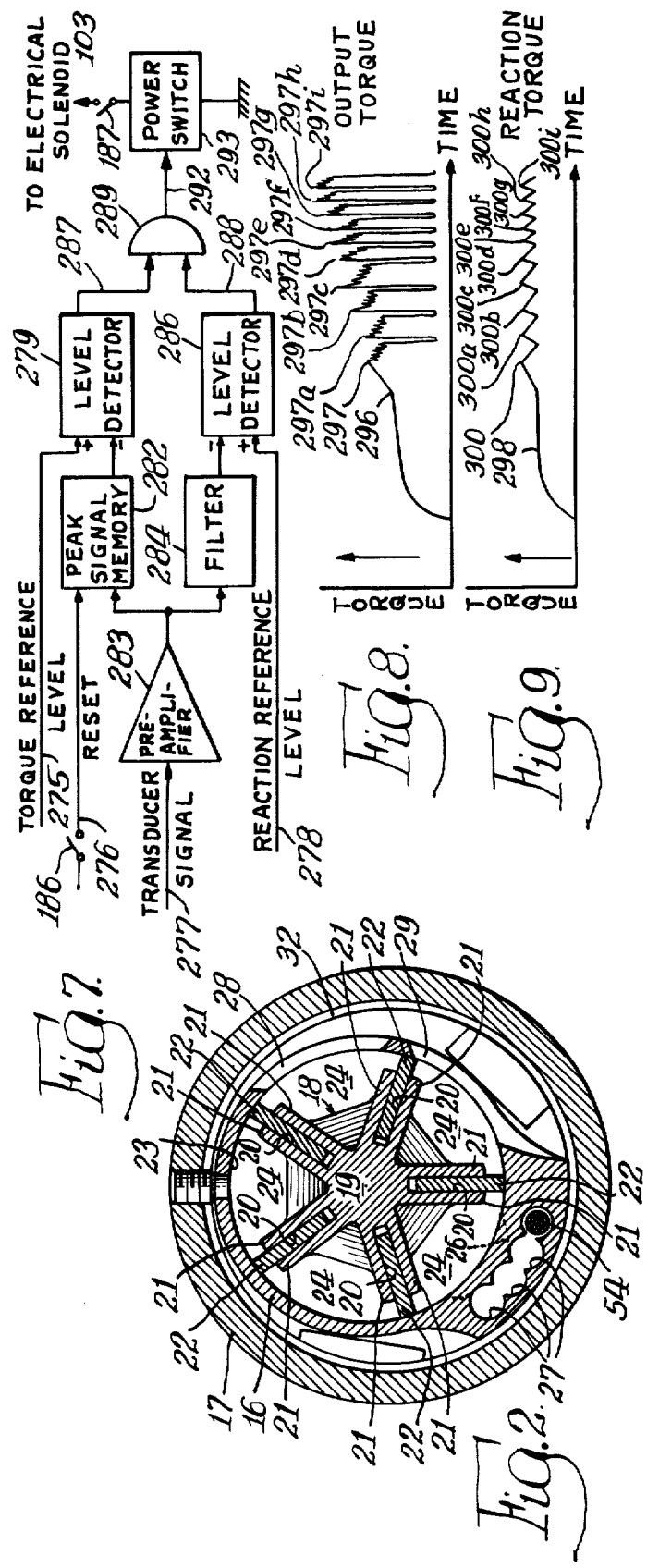

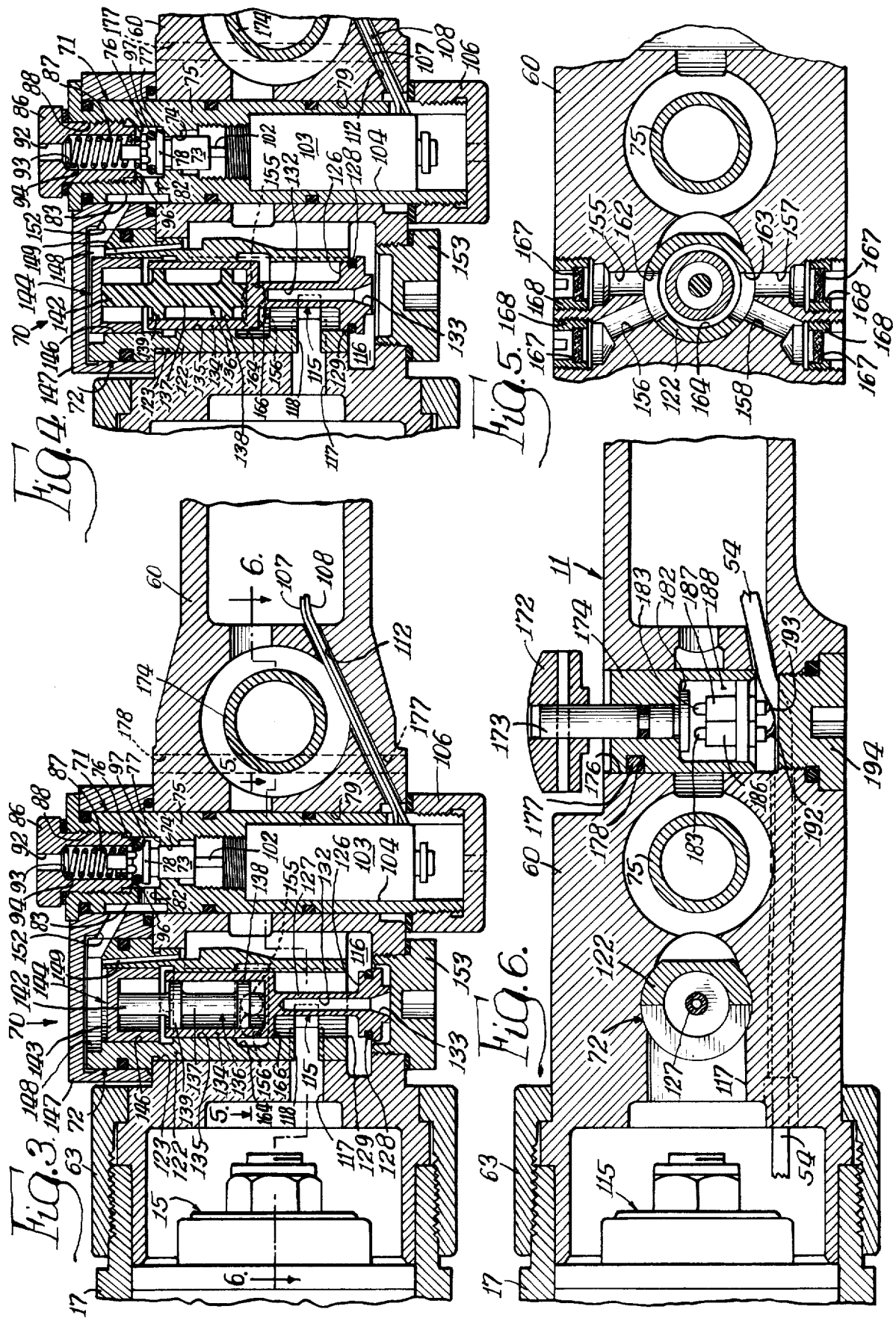

POWER TOOL WITH CONTINUOUS AND PULSATING TORQUE OUTPUT CYCLE

This invention relates to power tools, and more particularly relates to a power tool which is capable of precisely and consistently applying a predetermined peak dynamic torque to threaded fasteners under varying joint and power supply conditions and which prevents excessive reaction forces from being imposed on the tool operators.

Of the many requirements to be satisfied by power tools utilized to apply torque to threaded fasteners in mass production operations, such as automobile assembly plants and the like, preciseness and consistency of torque output, as well as minimization of reaction torque on the operator of the tool, are most important. Consequently, various types of power tools and control systems have been heretofore advanced in an effort to satisfy these requirements.

While many of the power tools heretofore advanced satisfy some of the aforementioned reqirements, so far as is known, none satisfies all of the aforementioned requirements. Thus, while impact wrenches are capable of applying relatively high torques to fasteners without imposing excessive reaction torques on the operator, such tools lack the preciseness of control required to assure consistent safe tensioning of different types of joints. Large stall torque tools are objectionable from the standpoint that, since a large portion of the output torque is imposed on the operator as a reaction torque when soft joints are being tightened, reaction bars or other torque resisting devices are necessary to prevent injury to the operator. However, where reaction bars or the like are employed and the tool is being used in an assembly line, substantial slowing of the assembly line occurs.

The control system heretofore developed to control the operation of production line tools have likewise not proved entirely satisfactory for various reasons. Thus, where pneumatic shut-off systems have been employed, consistent final torque values have not been obtained under joint conditions, large reaction forces have been imposed on the operator when soft joints were fastened, and continuous or runaway operation has occurred when the supply pressures fell below normal operating levels.

The control systems which utilize electronics to automatically shut-off an associated tool have likewise not proved entirely satisfactory in that some of these systems likewise do not prevent large reaction forces from being imposed on the operator of the tool when soft joints were fastened nor did they provide for the safety of the operator of the tool if the electronic system malfunctioned.

Accordingly, it is a general object of the present invention to provide a novel power tool which overcomes the aforementioned objections and disadvantages.

Another object is to provide a novel power tool which is capable of consistently applying a precise peak dynamic torque to joints having different degrees of hardness.

A further object is to provide a novel power tool which limits the reaction torque imposed on the operator to a predetermined maximum, regardless of the torque output of the tool.

A more particular object is to provide a novel power tool having a cycle of operation wherein a continuous torque is initially applied to a joint until a predetermined torque level is obtained in the joint and wherein a pulsating torque is applied to the joint for the remainder of the cycle until a predetermined peak dynamic torque level is achieved in the joint.

Another object is to provide a novel power tool of the foregoing character wherein the frequency of the pulsations increases during the pulsating portion of the torque cycle.

Still another object is to provide a novel power tool of the character described wherein the torque output of the tool pulsates for a portion of the operating cycle and wherein the inertia of the motor and drive components of the tool is utilized to minimize the reaction torque applied to the operator.

A more particular object is to provide a novel power tool for applying torque to threaded fasteners, wherein aa pneumatic motor is utilized as the prime mover of the tool and wherein the rotor is of a lightweight construction to reduce the inertia thereof.

Another object is to provide a novel control valve assembly for a pneumatic power tool having an operating cycle in which the torque output pulsates for a portion of the cycle, wherein a lightweight, poppet-type valve is employed to reduce the response time of the valve when the tool is pulsating.

A more particular object is to provide a novel pneumatic power tool wherein a valve is provided in the air supply passage to the pneumatic motor of the tool to permit rapid starting and stopping of the motor during a portion of the operating cycle of the tool and wherein vent passages are connected to the air supply passage between the valve and motor and are opened by the valve when the latter closes to facilitate rapid stopping of the motor.

Still another object is to provide a novel power tool of the character described which prevents wrenching of a joint during and after the completion of an operating cycle.

A more particular object is to provide a novel pneumatic power tool having a fluid pressure actuated valve for controlling the supply of air under pressure to the pneumatic motor of the tool, wherein a transducer is provided in the drive train of the tool to provide an electrical signal proportional to the instantaneous torque being applied by the tool to a joint and wherein the signal from the transducer is utilized by an associated control system to control the operation of a solenoid-actuated pilot valve for controlling the control valve so that the torque output of the tool pulsates during a portion of its operating cycle.

Another object is to provide a novel method for controlling the torque output of a power tool so that a precise peak dynamic torque value is obtained in a joint being tightened and the reaction torque imposed on the operator does not exceed a predetermined value.

Other objects and advantages of the invention will become apparent from the following detailed description and accompanying sheets of drawings, wherein:

FIG. 1 is an elevational view, on a reduced scale and with some parts broken away to show internal details, of a power tool embodying the features of the present invention;

FIG. 2 is an enlarged, transverse sectional view taken along the line 2—2 of FIG. 1;

FIG 3 is an enlarged fragmentary, longitudinal section view taken along the line 3—3 of FIG. 1;

FIG. 4 is a fragmentary, longitudinal sectional view, similar to FIG. 3, but showing the parts of the tool in different positions;

FIG. 5 is a fragmentary, staggered, longitudinal sectional view, with some parts in elevation, taken substantially along the line 5—5 of FIG. 3;

FIG. 6 is a fragmentary, staggered, longitudinal sectional view taken along the line 6—6 of FIG. 3;

FIG. 7 is a block diagram of an electrical circuit such as may be used in a control system to control the operation of the tool illustrated in FIG. 1;

FIG. 8 is a graph of torque output of the tool illustrated in FIG. 1 during a cycle of operation, plotted against time; and FIG. 9 is a graph of the reaction torque exerted by the tool illustrated in FIG. 1 on a operator during a cycle of operation, plotted against time.

Briefly described, the present invention contemplates a novel power tool capable of applying a precise torque to threaded fasteners so that consistent peak dynamic torque levels are obtained in joints of different degrees of hardness. The tool, to be hereinafter described in detail, also limits the reaction torque applied to the operator to a predetermined maximum, regardless of the torque output of the tool and variations in the power supply to the tool. To this end, a novel operating cycle is employed in the tool such that the torque output during the initial portion of the cycle is continuous and then becomes pulsating for the remainder of the cycle. As a result of the pulsating portion of the torque cycle, a precise peak dynamic torque is obtained in joints of varying hardness and the reaction torque imposed on the operator is limited to a predetermined maximum regardless of the peak dynamic torque value obtained in the joint.

In the embodiment to be hereinafter described, the tool includes torque generating means in the form of a pneumatic motor and a control valve assembly for controlling the operation of the pneumatic motor. The control valve assembly includes a low inertia, fluid pressure actuated control valve mounted in the air supply passage of the tool, and a solenoid-actuated pilot valve for controlling the position of the control valve. The control valve remains continuously open during the initial portion of the torque cycle of the tool and then is caused to rapidly shift between its open and closed positions by the pilot valve so that the supply of air under pressure to the motor becomes intermittent. Consequently, the torque output of the tool pulsates during the final portion of the torque cycle.

The aforementioned rapid closing and opening of the control valve is achieved by the rapid pressurizing and venting to the atmosphere of a chamber at one end of the control valve. Movement of the control valve between its open and closed positions is effected by the pressure of the air in the air supply passage of the tool.

The effects of inertia on the pulsation frequency of the tool are minimized through a reduction in the weight of the components of the control valve and rotor of the pneumatic motor. In addition, vent passages are provided in the tool for venting the pumping chambers of the motor, and the portion of the air supply passage between the motor and control valve, to the atmosphere when the control valve shuts off the flow of air to the motor. Consequently, the pulsation frequency of the tool is not reduced by residual air pressure in the motor and air passage at the end of each pulsation.

The operation of the tool is controlled by an associated control system, such operation being entirely automatic after being initiated by the manual depression of a push button on the handle of the tool. However, the operation of the tool may be interrupted at any time, merely by releasing the push button, and the cycle may be reinstated at any intermediate point merely by again depressing the push button.

THE GENERAL CONSTRUCTION OF THE TOOL

In FIG. 1, a power tool embodying the features of the present invention is illustrated and indicated generally at R. The tool R is similar in construction to the tool disclosed in the now pending Edmund C. Dudek U.S. Pat. application SER. No. 359,640, filed May 14, 1973, and assigned to the assignee of this application. Reference should therefore be made to the aforementioned Dudek application for a more detailed explanation of the internal components and general construction of the tool R of the present application.

The tool R, in the present instance, comprises a nutsetter having an elongated, generally cylindrical tool body 10. A handle assembly 11 is secured to one end of the body and torque output means in the form of a right angle nutsetter attachment 12 is secured to the opposite end of the body 10.

The body 10 includes torque generating means, in the present instance a pneumatic motor indicated generally at 15, as its prime mover. It should be understood, however, that other types of motors, e.g. electric or hydraulic, could be used instead of a pneumatic motor. The motor 15 includes a cylinder block 16 that is enclosed and supported by a sleeve-like housing 17. A rotor, indicated generally at 18 in FIGS. 1 and 2, is rotatably supported in the cylinder block 16. The rotor 18 includes an elongated rotor body 19 having a plurality of radially extending, longitudinal slots 20 therein for receiving a plurality of blades 22. In the present instance, five equidistantly spaced blades 22 are provided in the rotor body 19.

According to the present invention, the rotor body 19 is of a light-weight construction in order to reduce the inertia thereof. To this end, the material of the rotor body 19 between the blades 20 is removed so that the blades 22 are received in thin-walled portions 21 of the body 19. The portions 21 taper axially from the center of the rotor body 19 toward each end thereof.

The rotor blades 22 are urged radially outwardly in their slots 20 and into fluid pressure sealed engagement with the inner wall, indicated at 23, of the cylinder block 16 by bleed air from the air supply passage in the tool body 10. The blades 22 thus define a plurality of chambers 24 in the motor 15, which sequentially receive air under pressure from a port 26 (FIG. 2) in the inner wall 23 of the cylinder block 16. The port 26 is connected to the air supply passage in the tool body 10 through intermediate passages (not shown) in the cylinder block 16, which include a plurality of intersecting axial bores 27 (FIG. 2).

Air is exhausted from the chambers 24 through a plurality of circumferentially extending, axially spaced slots in the cylinder block 16, two of such slots being indicated at 28 and 29 in FIG. 2, respectively. Air exhausting through the slots 28 and 29 finds its way into an annular clearance space 32 between the cylinder block 16 and housing 17 from whence it flows through the interior of a two-piece housing 35 (FIG. 1) secured to the forward or left end of the motor housing 17 by screws 36. The exhaust air discharges to the atmosphere through a ring of inclined bores 37 in a gear case member 40 at the left end of the housing 35 as viewed in FIG. 1.

The rotor body 19 is splined or otherwise drivingly connected to the input shaft (not shown) of the nutsetter attachment 12 through a suitable drive train such as a two-stage planetary reduction gear train (also not shown). Such gear train includes the gear case member 40, the latter having a stationary internal ring gear 42 forming a part of the second stage of the planetary reduction gear train. The gear case member 40 also includes a transducer, indicated generally at 50, for generating a signal proportional to the torque output at the spindle 13 of the nutsetter attachment 12. Such transducer is described and claimed in the aforementioned Edmund C. Dudek U.S. Pat. application Ser. No. 359,640 and comprises a torsionally resilient portion 51 of the gear case member 40, and a plurality of torsional strain responsive signal generating elements, such as strain gauges, secured to flat outer surface portions of the torsionally resilient portion 51. The strain gauges are preferably electrically connected in a Wheatstone bridge network, and the latter is connected by conductors, indicated at 53 in FIG. 1, of an electrical cable 54 which extends through the tool body 10 and handle assembly 11 and thence through a portion of the air hose 14 connected to the handle assembly 11. The cable 54 emerges from the hose 14 through a suitable junction fitting (not shown) in the hose 14.

After emerging from the hose 14, the cable 54 is connected to an associated control system, for controlling the operation of the tool R. In the present instance, the control system is electrical in character, although other types of control systems, such as mechanical or fluidic, could also be employed. The components and mode of operation of one electrical circuit which may be used in the control system for controlling the operation of the tool R, will be described more fully hereinafter.

As heretofore mentioned, the tool R includes a handle assembly 11. The handle assembly 11 includes an elongated handle body 60, which is detachably connected to the right end of the tool body 10, as viewed in FIGS. 1 and 3, by a threaded collar 63. Specifically, the collar 63 is threaded onto the right end of the motor housing 17. The right end of the handle body 60, as viewed in FIG. 1, is threaded to receive a fitting 64 connected to the end of the air hose 14. Thus air under pressure in the hose 14 enters the handle body 60 through the fitting 64 and then passes through passages in the body to control means in the form of a control valve assembly, indicated generally at 70 in FIGS. 3 and 4.

THE CONSTRUCTION OF THE CONTROL VALVE ASSEMBLY 70

The control valve assembly 70 includes a pilot valve portion 71 and a control valve portion 72. The pilot valve portion 71 includes a poppet-type pilot valve 73 which is shiftably mounted in a bore 74 in an elongated bushing 75. The bushing 75 is in turn mounted in a bore 79 in the handle body 60, which extends transversely to the axis of the body. The pilot valve bore 74 is counterbored as at 76 to define a shoulder 77 which is engaged by a flange 78 on the pilot valve 73 when the latter is in its open position, as illustrated in FIG. 4. A port 82 in the bushing 75 intersects the counterbore 76 above the shoulder 77, the outer end of the port 82 registering with an elongated recess or slot 83 in the outer surface of the bushing 75.

A tubular cap 86 having an internal cylindrical bore 87 therethrough is threaded into another counterbore 88 in the bushing 75, the bore 87 including a reduced diameter portion 92 defining a shoulder 93 near the upper end of the cap as viewed in FIGS. 3 and 4. The shoulder 93 serves as a seat for one end of a compression coil spring 94, the opposite end of which bears against the pilot valve 73. The lower end, indicated at 96, of the cap 86 provides a seat for an O-ring 97 mounted on the pilot valve 73. When engaged with the seat 96, the O-ring 97 prevents air from flowing through the port 82 and cap 86 to the atmosphere.

The spring 94 normally urges the pilot valve 73 to its open position illustrated in FIG. 4, and the plunger 102 of a solenoid 103 serves to shift the pilot valve 73 to its closed position illustrated in FIG. 3 when the solenoid is energized. To this end, the solenoid 103 is mounted in a counterbore 104 in the bushing 75, the lower end of the counterbore 104 being closed by a cap 106 threaded over the lower end of the bushing 75 as viewed in FIGS. 3 and 4.

Current is supplied to the solenoid 103 through a pair of conductors 107 and 108. The conductors 107 and 108 may be routed through a diagonally extending bore 112 in the handle body 60, the conductors 107 and 108 then merging with the cable 54 before the latter emerges from the handle housing 60.

The control valve portion 72 of the control valve assembly 70 includes a control valve member 115, which is also of the poppet-type and which serves to control communication between a cavity 116 at the lower end of the valve member, as viewed in FIG. 3, and a generally axially extending passage 117 in the handle body 60. The cavity 116 communicates by interconnected bores and cavities (not shown) in the handle body 60, which comprise a portion of the air supply passage through the handle body 60, and thence with the air hose 14. Thus, air at line pressure is present in the chamber 116 when the tool R is ready for operation.

The inner or left end of the passage 117 communicates with the inlet ports (not shown) of the pneumatic motor 15 and the inner or right end of the axial passage 117, as viewed in FIGS. 3 and 4, registers with a port 118 in a tubular bushing 122, which is mounted in a transverse bore 123 in the handle body 60 closely adjacent to the pilot valve bushing 75. The axes of the pilot valve bushing 75 and control valve bushing 122 are preferably parallel.

As heretofore mentioned, the control valve member 115 is of the poppet-type and thus includes a generally disk-like head 126 carried at one end of a stem portion 127. An O-ring 128 is mounted in a circumferential groove in the head 126 for engaging the lower end, indicated at 129, of the bushing 122 when the control valve member 115 is in its closed position illustrated in FIG. 4. In order to reduce the weight of the head 126 and stem 127 of the control valve member 115, the stem 127 and head 126 may be internally bored as at 132 and counter-bored as at 133, respectively.

The upper end, as viewed in FIGS. 3 and 4, of the stem 127 is connected to the end wall of a cup-shaped guide portion 134 which is slidably mounted in the bore, indicated at 135, of the control valve bushing 122. A lightweight or low inertia spacer member 136, which may be of Lexan or a similar lightweight, high-strength plastic material, is mounted in the guide portion 134. The spacer member 136 has a rod-like stem portion 137 and a pair of axially spaced cylindrical flanges 138 and 139 (FIG. 3) which closely fit the internal diameter of the guide portion 134. The stem portion 137 has a length greater than the guide portion 134 so that one end 142 thereof extends outwardly of the guide portion 134 and into engagement with the inner surface of the end wall 143 of a cup-shaped cap or piston 144. The cap 144 is slidably mounted in a counter-bored portion 146 of the bushing bore 135, the diameter of the counterbore 146 being somewhat greater than the bore 135.

An elongated, oval-shaped cover or housing member 147 encloses the upper end of the bushing 122 and defines a chamber 148 at the upper or outer end, as viewed in FIG. 3, of the cap 144. The cross sectional area relationship between the cap 144 and valve guide portion 134 is such that when air at line pressure (about 90 p.s.i.) is present in the chamber 148, the control valve member 115 will rapidly shift downwardly in the bushing 122 to its open position illustrated in FIG. 3 with a force of about 3 lbs. Air under pressure is supplied to the chamber 148 through an inclined bore 149, which is sufficiently small to prevent an excessive flow of bleed air through the pilot valve portion 71 when the tool R is inoperative but subject to line pressure in the hose 14. However, the diameter of the bore 149 is not so small as to reduce the response time of the control valve 115. A cap 153 is threaded into the housing 60 and provides a stop limiting downward movement of the control valve member 115, as shown in FIG. 3, and also permits access to the valve for inspection and/or replacement.

Pressurization and venting of the chamber 148 to effect opening and closing of the control valve 115 is controlled by the pilot valve 73. To this end, a diagonally extending bore 152 (FIGS. 3 and 4) is provided in the housing 147, the bore 152 being connected at one end with the chamber 148 and at its opposite end with the recess 83 in the side wall of the pilot valve bushing 75. Consequently, when the pilot valve 73 is in its open position illustrated in FIG. 4, air under pressure in the chamber 148 will vent to the atmosphere through the diagonal bore 152, recess 83 and port 82 in the pilot valve bushing 75, and thence through the counterbore 87 and reduced diameter portion 92 of the bore through the cap 86. Since the cross sectional area of the diagonal bore 152 is substantially greater than the inclined bore 149, the pressure in the chamber 148 will be insufficient to unseat the control valve 115 when the pilot valve 73 is in its open position shown in FIG. 4.

In order to effect rapid venting of the chambers 24 (FIG. 2) of the pneumatic motor 15 when the control valve 115 is in its closed position illustrated in FIG. 4 and thereby effect rapid stoppage of the motor, at least one and preferably two pairs of vent passages 155, 156 and 157, 158 (FIG. 5) are provided in the handle housing 60 for this purpose. The inner ends of the pairs of passages 155, 156 and 157, 158, respectively register with a pair of arcuate ports 162 and 163 in the control valve bushing 122, and with an annular groove 164 (FIGS. 3 and 4) in the bore 135 of the bushing 122. The groove 164 has a width such that the lower or inner end face, indicated at 166, of the end wall of the cup-shaped guide portion 134 will move past the lower edge of the groove 164 and establish communication between the port 118 in the bushing 122 and the vent passages 155, 156 and 157, 158 when the valve 115 is in its closed position illustrated in FIG. 4.

In order to attenuate the sound level of the air flow flowing outwardly through the vent passages 155-157 when the control valve 115 has shifted to its closed position illustrated in FIG. 4, attenuating means in the form of a plurality of sintered bronze disks 167 are mounted in the outer ends of the vent passages for this purpose. In the present instance, the disks 167 are supported in tubular inserts 168 threaded into the outer ends of the vent passages 155-157. The material of the disks 167 preferably has an average pore size of about 90 microns.

The disks 167 also serve to restrict the flow of air through the vent passages 155-157 to a certain extent and thus maintain a slight back pressure in the passages of the handle assembly 11 and motor 15. Such back pressure serves to maintain the various parts of the drive train of the tool R in engagement during the period when the control valve 115 is rapidly shuttling between its open and closed position to cause the torque output of the tool R to pulsate.

The initiation of a torque cycle of the tool R is effected by depression of a manually actuated push button 172 (FIGS. 1 and 6) on the handle assembly 11. The push button 172 is secured to a stem 173 which is reciprocably mounted in a tubular guide 174, the guide 174 being mounted in a transverse bore 176 in the handle body 60. The axis of the stem 173 is perpendicular to the axes of the pilot valve and control valve bushings 75 and 122. A retaining pin 177 (FIGS. 3, 4 and 6) extends through a cross bore in the handle body 60 and through a slot 178 in the guide 174 for retaining the latter in the housing bore 176.

The lower or inner end, indicated at 182, of the stem 173 overlies the plungers indicated at 183 of a pair of switches 186 and 187 mounted in a cavity 188 in the guide 174. Electrical conductors indicated at 192 and 193 are respectively connected to the switches 186 and 187, and merge with the cable 54. The conductors 192 and 193 are connected to the associated control system for the tool R. A plug 194 may be threaded into the handle housing 60 to facilitate installation and/or removal of the switches 186 and 187 for servicing or replacement.

OPERATION OF THE CONTROL VALVE ASSEMBLY 70 AND TOOL R

Assuming that line air pressure is present in air supply passage of the tool R from the hose 14 and in the chamber 116, and that the operator has not depressed the push button 172, the solenoid 103 will be deenergized and the pilot valve 73 will be held in its open position shown in FIG. 4 by the spring 94. Consequently, the chamber 148 at the upper end of the control valve 115 will be vented to the atmosphere through the diagonal bore 152, recess 83, port 82 and through the interior of the tubular cap 86. The control valve 115 is biased to its closed position shown in FIG. 4 at this time by a force of about 30 lbs.

When the operator depresses the push button 172, thereby closing the switches 186 and 187, the associated control system causes current to be supplied to the solenoid 103 through the conductors 107 and 108. Consequently, the plunger 102 extends and raises the pilot valve 73 to its closed position illustrated in FIG. 3. Communication of the chamber 148 with the atmosphere through the vent passages 152, 83, 82 and tubular cap 86 is thus interrupted and the pressure in the chamber 148 rapidly rises. Such pressure acts on the piston or cap 144 and causes the control valve 115 to be rapidly shifted downwardly toward its open position illustrated in FIG. 3. The force tending to open the control valve 115 is about 3 lbs. and the time required for the control valve to move to either of its open or closed positions is on the order of a few milliseconds. This short response time is due in part to the lightweight construction of the components of the control valve train and the short stroke of the valve, which is about 0.010 inches.

When the control valve 115 opens, air under pressure is supplied to the chambers 24 (FIG. 2) of the pneumatic motor 15 causing the motor to rotate and torque to be applied to a nut or other fastener with which the spindle 13 of the nutsetter attachment 12 is engaged. The valve 115 will remain in its open position shown in FIG. 3 while the nut is run down or until the reaction torque on the operator which is also sensed by the transducer 50, reaches a value of about 10 ft. lbs. When this torque level is reached, the signal from the transducer 50 causes the associated control system to interrupt the flow of current to the solenoid 103 and thus permit the pilot valve 73 to shift to its open position shown in FIG. 4 and thereby cause the control valve 115 to close.

The control valve 115 will remain closed for a very short interval and will then be caused to rapidly open and close due to a corresponding interruption and establishment of the current flow to the solenoid 103 by the associated control system. Such rapid opening and closing of the control valve 115 causes the torque output of the tool R at the spindle 13 to pulsate in the manner of an impact wrench. The frequency of the torque pulsations is about 600 cycles per minute when the tool starts to pulsate and gradually increases to about 700 annd up to 1,200 cycles per minute before the tool shuts off. The result of such pulsating torque output is that the operator of the tool feels a reaction torque which is only an average of the peak torque impulses applied to the fastener by the tool R.

When the peak dynamic torque being applied to the joint reaches the desired value, which is likewise sensed by the transducer 50, the associated control system prevents any further current flow to the solenoid 103 and the tool R remains shut off. The operator then knows that the torque transaction is complete. He may then release the push button 172 and disengage the tool from the joint. If the operator should release the push button 172 for some reason during the torquing operation and disengage the tool from the joint, the partially completed torque transaction can be reinstated merely by reengaging the tool R with the joint and depressing the push button 172. The tool R will then pick up at the point where the previous torque cycle was interrupted and then complete the cycle.

ELECTRICAL CIRCUIT OF A CONTROL SYSTEM FOR THE TOOL R

In FIG. 7, an electrical circuit comprising one exemplary control system for controlling the operation of the tool R during a cycle of operation, is illustrated. It should be understood, however, that other types of control systems, such as a hydraulic or pneumatic control system, could be utilized instead of the electrical circuit shown in FIG. 7.

The circuit illustrated in FIG. 7 performs several functions, one of which is to shut off the tool when the peak dyamic torque output of the tool and in the joint reaches a predetermined value. The other important function performed by the circuit is to limit the reaction torque exerted by the tool on the operator by causing the torque output of the tool to pulsate rather than to be continuously applied to the joint. The manner in which these functions are performed by the circuit illustrated in FIG. 7 will be described in conjunction with the graphs illustrated in FIGS. 8 and 9.

As will be apparent from FIG. 7, the circuit has four different inputs which are identified by legend and indicated at 275, 276, 277 and 278. The switches 186 and 187 in the handle assembly 11 of the tool are shown schematically in the circuit.

The torque reference level input signal on the line 275 is derived from a potentiometer which is connected across a D. C. power supply (not shown) and establishes the peak dynamic torque level at which the tool R will shut off. This signal is supplied to one of the inputs of a level detector 279.

The line 276 supplies a reset signal or voltage to one of the two inputs of a peak signal memory circuit 282, the reset signal being derived from a separate D. C. power supply (also not shown). The output of the peak signal memory circuit 282 is supplied to another input of the level detector 279.

The line 277 supplies the signal from the transducer 50, which is proportional to the dynamic torque being delivered by the tool to the joint being tightened, to the input of a preamplifier 283. The output from the preamplifier 283 is supplied to another of the inputs of the peak signal memory circuit 282, and also to the input of a filter 284. The output of the filter 284 is in turn supplied to one of the two inputs of another level detector 286.

The line 278 supplies a reaction reference level signal, which is derived from a fixed or variable resistor, to another of the inputs of the level detector 286.

The outputs from the level detectors 279 and 286 are respectively supplied by conductors 287 and 288 to an AND gate circuit 289. The output from the gate circuit 289 is supplied by a conductor 292 to a suitable power switch 293 which is connected to and controls the flow of current to the windings of the solenoid 103 of the control valve assembly 70.

OPERATION OF THE ELECTRICAL CONTROL CIRCUIT SHOWN IN FIG. 7

Assuming that the transducer 50 has been adjusted and calibrated, the torque reference level potentiometer has been adjusted to provide a desired signal on the line 275, a desired reaction reference level signal is present in the line 278 through the selection of a proper fixed resistor or adjustment of a variable resistor in the circuitry, and that the spindle of the tool R has been connected to a joint to be torqued, the tool R and electrical circuit for controlling the same is brought into operation by depressing the push button 172. Depression of the plunger 172 closes the switches 186 and 187 (FIGS. 6 and 7) in the handle assembly 11. Closure of the switch 186, supplies a voltage to the peak signal memory circuit 282 to cancel out the previous peak dynamic torque output value being retained from the previous torque operation and renders the memory circuit ready to receive and retain the signal supplied thereto from the preamplifier 283 during the next torque cycle.

Closure of the switch 187 places the solenoid 103 of the control valve assembly 70 under the control of the power switch 293, which may be a power transistor or similar component, and hence under the control of the control circuit shown in FIG. 7. At the start of each torque cycle and after closure of the reset switch 186, the power switch 293 will be in its on or conducting state since a high signal will be supplied to the power switch 293 from the AND gate circuit 289 as a result of the latter circuit receiving suitable high signals from the level detectors 279 and 286.

The level detector 279 supplies a high signal to the AND gate circuit 289 at the start of each torque cycle since the output thereof is not reversed until the level of the signal supplied to the peak signal memory circuit 282 from the preamplifier 283 reaches a predetermined value.

The output from the level detector 286 likewise remains high to the AND circuit 289, which is necessary for the latter to conduct, so long as the signal from the filter 284 is less than the reaction reference level signal in the line 278.

As the output spindle 13 of the tool R supplies torque to the joint, the torque level in the joint will increase and be sensed by the transducer 50. Consequently, the signal from the transducer 50 in the line 278 will increase. In FIG. 8, which is a plot of the output torque of the tool against time, the portion of the curve up to the point 296 represents the torque output of the tool while the nut of the joint is being run down, and the point 297 represents the point on the curve where the reaction torque sensed by the transducer 50 reaches a predetermined threshold value such as to cause the signal being supplied by the filter 284 to the level detector 286 to equal or exceed the reaction reference level signal. The torque output of the tool at the point 297 is a percentage of the full scale value of the transducer 50, which may range from 5 to 80 percent of such full scale value. Thus, the torque output at the point 297 may be changed to suit the variables of the torquing operation.

The build-up of reaction torque on the tool operator from the start of the torque cycle until the level detector 286 causes the torque output of the tool R to pulsate is represented by the portion of the curve indicated at 298 in FIG. 9, the point 300 indicating the point where the tool begins to pulsate.

When the output of the level detector 286 causes the AND gate 289 to shut off the power switch 293, the pilot valve solenoid 103 is deenergized and the pilot valve 73 is rapidly caused to shift to its closed position shown in FIG. 4 due to the force of the spring 94. Consequently, air pressure in the chambers 24 of the air motor 15 rapidly drops and the torque output of the tool R likewise rapidly drops.

As the torque output of the tool drops, the signal from the transducer 50 to the preamplifier 283, and consequently the signal from the preamplifier 283 to the filter 284, likewise drops. Since the signal from the filter 284 to the level detector 286 is proportional to the signal from the transducer 50, when the signal from the filter 284 to the level detector 286 falls below the reaction reference level signal on the line 278, the signal from the level detector 286 in the line 288 again becomes high and the AND gate circuit 289 supplies an appropriate signal to the power switch 293 to cause it to conduct. Consequently, the solenoid 103 is energized and the control valve 115 is caused to rapidly shift to its open position illustrated in FIG. 3. Air under pressure is then admitted to the chambers 24 of the air motor 15 and the output spindle 13 then again begins to apply torque to the joint. The torque will build up in the joint until the reaction torque sensed by the transducer 50 reaches a value sufficient to again trigger the level detector 286 and cause the AND circuit 289 to shut off the power switch 293. Thus, the tool R is turned on and off as the signal from the transducer 50 in the line 277 to the preamplifier 283 rises and falls relative to the reaction reference level signal in the line 278.

The level detector 286 includes a hysterisis resistor and the filter 284 includes a feed back circuit, the result of both of which is to cause the level detector 286 to delay its control signal to the AND gate each time the power switch is turned on and off. Consequently, the maximum peak dynamic torque output of the tool increases by a certain increment after each cycle of operation as illustrated in FIG. 8, as indicated by the increasing peak output torque values in the graph. Such peak torque points are indicated at 297a–297i respectively in FIG. 8. The circuitry in the filter 284 and level detector 286 also cause the on-times of the tool to decrease as the torque level in the joint approaches the desired final value. Such decrease in on-time is also illustrated in FIG. 8 by the progressively narrowing width of the output torque cycles shown in the figure. The result of the foregoing is that, even though the peak output torque of the tool increases toward a final torque value during the pulsating portion of its cycle, the reaction torque imposed on the operator by the tool is only an average of the output torques. Such average remains substantially constant as indicated by the peak reaction torque levels illustrated in FIG. 9 and identified at 300a–300i, respectively.

When the peak dynamic torque output of the tool reaches the desired level to be achieved in the joint, the signal from the transducer 50, as amplified by the preamplifier 283, causes the peak signal memory circuit 282 to supply a signal to the level detector 279 which causes the signal from the level detector 279 to the AND gate 289 to change to a low value. Consequently, the AND gate 289 shuts off the power switch 293 and deenergizes the solenoid 103. The tool R thus ceases to operate and, because of the memory in the peak signal memory circuit 282, the tool remains shut off even though the operator continues to hold the push button 172 depressed. The tool will not begin another cycle of operation until the push button 172 is released and then again depressed since the reset signal in the line 276 to the peak signal memory circuit 282 must be renewed in order to initiate another cycle of operation.

Because of the foregoing characteristics of the electrical circuit shown in FIG. 7, it will be apparent that the torque cycle of the tool R can be interrupted at any point and the cycle reinstated merely by engaging the tool with the point and then depressing the push button 177.

The structural features of the components of tool R, as well as the characteristics of the circuit shown in FIG. 7, also substantially preclude any torque values from being obtained which are less than the desired value to which the circuit has been adjusted. In other words, the slight torque scatter that does occur is positively skewed. Thus, the tool has an extremely accurate torque setting capability and is usable in applications involving both low and high torque values.

While only one embodiment of the invention has been herein illustrated and described, it will be understood that modifications and variations thereof may be effected which fall within the scope of the appended claims.

I claim:

1. In a pneumatic tool or the like, including a tool body having a pneumatic motor therein for transmitting torque to a torque output member, an elongated handle connected to one end of said body, and an air supply passage extending through said handle, one end of said air supply passage being connected to said motor and the opposite end of said air supply passage being adapted to be connected to a source of air under pressure, the improvement of a control valve assembly for controlling the flow of air to said motor, said control valve assembly being adapted to be connected to and controlled by an associated control system, said control valve assembly comprising a control valve member mounted in a bore in said handle and movable between a first position permitting air under pressure to flow through said air supply passage to said motor and a second position preventing air under pressure from flowing through said air supply passage to said motor, said handle also having a chamber therein at one end of said control valve member for receiving air under pressure from said air supply passage, a piston slidably mounted in another portion of said bore in said handle and exposed to the pressure in said chamber, and a lightweight spacer member interconnecting said piston and said control valve member, said lightweight spacer member reducing the weight and response time of said piston-control valve member combination.

2. The control valve assembly of claim 1, wherein said spacer member is of Lexan.

3. The control valve assembly of 1, wherein said control valve member includes a disk-like head, a guide portion slidably mounted in said bore in said handle and spaced from said head, and a reduced diameter stem portion connecting said head and guide portion, said stem portion and said head having a central bore therethrough to reduce the weight and response time of said control valve member.

4. The control valve assembly of claim 3, wherein said piston and said guide portion are cup-shaped and arranged with their open interiors disposed toward each other, and said spacer is elongated and has its end portions respectively engaging the inner surfaces of the end walls of said piston and said guide portion.

5. In a pneumatic tool or the like, including a tool body having a pneumatic motor therein for transmitting torque to a torque output member, an elongated handle connected to one end of said body, and an air supply passage extending through said handle, one end of said air supply passage being connected to said motor and the opposite end of said air supply passage being adapted to be connected to a source of air under pressure, the improvement of a control valve assembly for controlling the flow of air to said motor, said control valve assembly being adapted to be connected to and controlled by an associated control system, said control valve assembly comprising a control valve member mounted in a bore in said handle and movable between a first position permitting air under pressure to flow through said air supply passage to said motor and a second position preventing air under pressure from flowing through said air supply passage to said motor, and at least one vent passage being provided in said handle for rapidly reducing the pressure in said pneumatic motor when said control valve member is in its second position, said vent passage being connected at one end to said air supply passage between said motor and said control valve member, the opposite end of said vent passage being open to the atmosphere, said vent passage being controlled by said control valve member so that when the control valve member is in its first position the vent passage is open and when the control valve member is in its second position the vent passage is closed.

6. The control valve assembly of claim 5, wherein said vent passage is restricted so as to maintain pressure in said motor when said control valve member is in its second position, whereby lash is prevented from developing in the various parts of the drive train of said tool when the torque output thereof is pulsating.

7. The control valve assembly of claim 6, wherein sound attenuating means is provided in said vent passage for muffling the level of the sound generated by the flow of air through said vent passage, said sound attenuating means also functioning to restrict the flow of air through said vent passage and to maintain said pressure in said motor.

8. The control valve assembly of claim 7, wherein said sound attenuating means comprises a porous, sintered bronze element extending across said vent passage.

* * * * *